(No Model.)
H. L. BOOTH.
GATE LATCH.
No. 390,645. Patented Oct. 9, 1888.
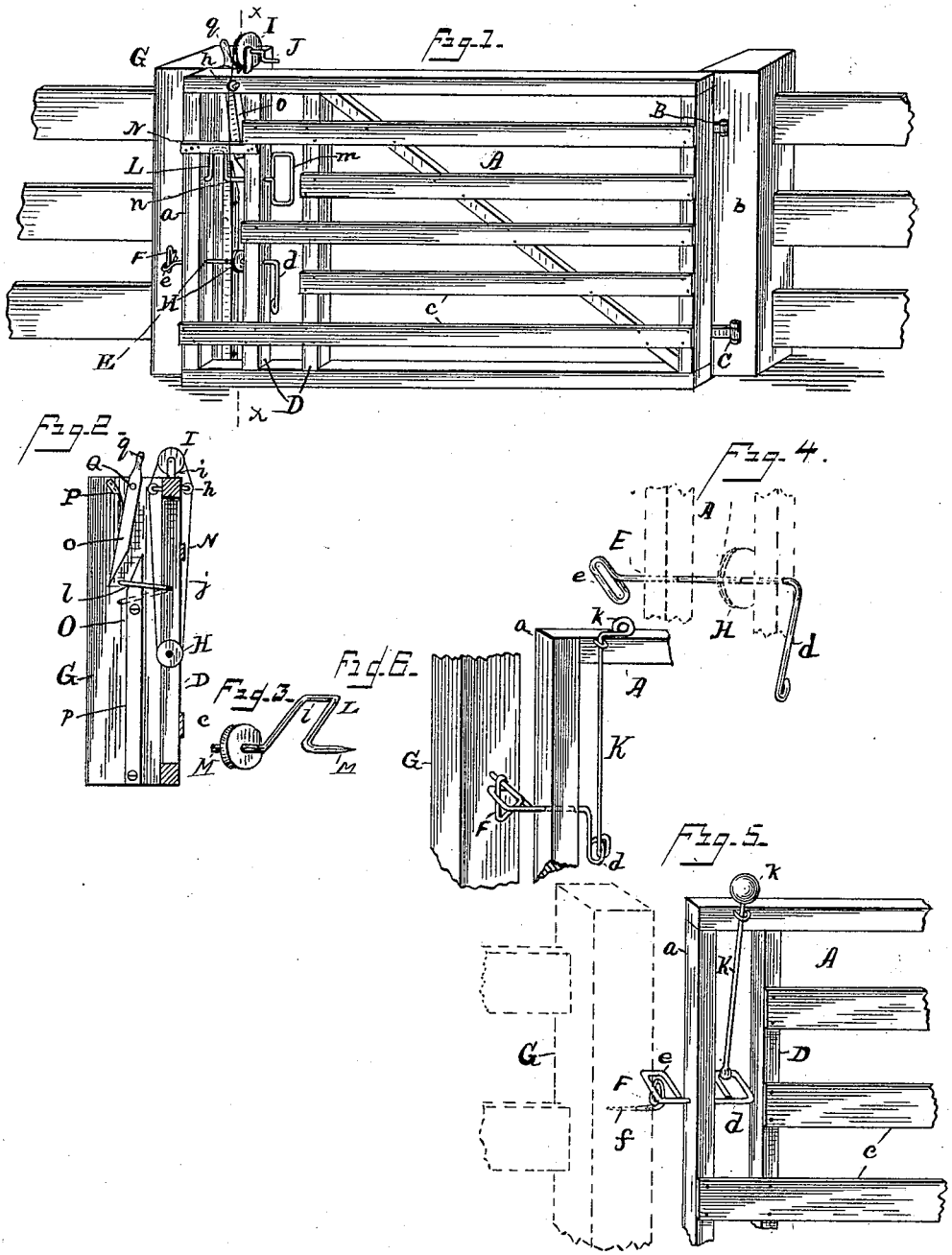
WITNESSES.
H. D. Nealy.
F. C. McCormick.
INVENTOR.
Henry L. Booth
By his Atty.
M. D. Peek
N. PETERS, Photo-Lithographer, Washington, D. C.

UNITED STATES PATENT OFFICE.

HENRY L. BOOTH, OF PULASKI, TENNESSEE.

GATE-LATCH.

SPECIFICATION forming part of Letters Patent No. 390,645, dated October 9, 1888.

Application filed November 2, 1887. Serial No. 254,078. (No model.)

*To all whom it may concern:*

Be it known that I, HENRY L. BOOTH, a citizen of the United States, residing at Pulaski, in the county of Giles and State of Tennessee, have invented certain new and useful Improvements in Gates and Gate-Fastenings; and I do hereby declare the following to be a full, clear, and exact description of the invention, such as will enable others skilled in the art to which it appertains to make and use the same, reference being had to the accompanying drawings, which form part of this specification.

My invention relates to a new and improved gate and fastening therefor, and has for its object to provide a gate with efficient and durable fastening devices, cheap of construction, that admits of the ready opening of the gate by an equestrian without dismounting, and at the same time is so constructed as to readily admit of the gate closing and fastening itself without unnecessary jar or concussion to the frame or injury to the fastening device; and it consists in the construction hereinafter described, and more particularly pointed out in the claims.

Referring to the drawings, Figure 1 is a perspective view of my improved device attached to a gate in a fence in position for operation. Fig. 2 is a sectional view on the line $x\ x$ of Fig. 1, showing a reserve or extra security-lock. Fig. 3 is a detached view of a security-latch intended to be operated from the top of the gate. Fig. 4 is a detached view showing the loop-latch with journal upon which the lower pulley is placed, and handle for pedestrians to operate. Figs. 5 and 6 show slightly-modified forms of devices for operating the fastening of the gate from the top.

Like letters of reference refer to corresponding parts in each figure of the drawings.

A represents a gate, which is constructed of standards and rails adapted for the application of my improved fastener, and has one or more uprights, D, within its frame near its locking end, to serve as supports and to provide vertical spaces for attaching the latches and opening device. One of the slats $c$ extends the entire length of the gate, while the others extend only from the hinge end to the first or second upright D, leaving vertical spaces between the uprights, or between the post $a$ of the frame and the last upright, for the operation of the latch.

The upper hinge, B, of the gate is composed of an eye with a short shank secured to the gate A, and a pintle with a long shank secured to the post $b$, and the lower hinge, C, of an eye with a long shank attached to the gate, and a pintle with a short shank attached to the post, so that when the gate is opened in either direction the latch end of the gate will gradually rise as it is opened and its upper side incline toward the post, and thereby have a tendency to close by its own gravity. The latch end of the gate is provided with a locking device that is fastened automatically when the gate is closed, and is so constructed as to be conveniently opened by persons on horseback as well as by pedestrians.

The latch E is composed of round bar-iron, having a loop, $e$, formed at one end. The other end and shank of the latch is passed through the post $a$ of the frame and the upright D, and the inner end bent at right angles to the shank to form a lever-handle, $d$, in the form of an arm or loop that is adapted to be turned in one of the vertical spaces between the uprights.

A keeper, F, is secured in the gate-post G, preferably by driving its tang $f$ into the post, said keeper having a triangular head formed by bending the material of the keeper into a loop of such shape that when the latch comes forcibly in contact with it in closing the gate it will ride over the incline and drop behind the vertical portion of the triangular head, and thus to some extent break the force of the gate and prevent concussion taking place. By this construction of latch and keeper the two loops, passing one over the other, serve the purpose of an ordinary fastening and provide means for the attachment of a padlock without providing extra means, as a hasp and staple.

The gate may be hung so as to swing in either direction, and be secured by the same kind of latch. In this event the triangular head of the keeper F is bent at right angles to the tang and driven into the side of the post G facing the gate.

As a matter of convenience for equestrians, who cannot reach the handle of the latch affixed to the gate for pedestrians, there is means provided at the top of the gate for operating the latch. For this purpose a pulley, H, is secured to the journal of the latch E in the space between the upright D and gate-post $a$, and another pulley, I, is journaled in standards $i$ on the upper side of the frame of the gate, having a crank, J, extending to one side as a means for operating the device. These two pulleys are united by a belt, $j$, passing over them and to either side of the gate-frame above.

On each lateral side of the upper rail of the gate-frame there are journaled smaller sheaves or pulleys, $h$, in supports extending out from the rail, over which the belt passes in rolling between the pulleys H and I, to prevent its striking the frame and other bars of the gate in its movement.

By this device the person on horseback is enabled to ride up to the gate and grasp the crank J without stooping down, and with but slight turn of the crank release the latch from the keeper, when the gate is readily thrown open and the rider passes through, and by the arrangement of the hinges B and C upon the post $b$ the gate will readily close by its own gravity and the loop-latch ride over the incline keeper and automatically fasten therein. I do not, however, confine my invention to this particular form of device for use by equestrians, as I may use a more simple one illustrated in Figs. 5 and 6, in which the latch-handle is bent into a loop, $d$, in which is swiveled the end of a vertical rod, K, which is extended above the upper rail of the gate-frame, and provided at its upper end with a handle, $k$, the rod passing through a loop or staple on the side of the upper rail and being held therein; or, if desired, it may extend through a slot in the upper rail.

In Fig. 5 the loop-latch $e$ and handle-loop $d$ of the latch are shown both bent inwardly toward each other on the same side of the bar or journal, to enable the latch to ride over the keeper F on the upper side and to be opened by means of the rod K, swiveled in the loop $d$. The upper end or handle $k$ of this rod is provided with and constitutes a weight, which by its own gravity holds the latch in place in the keeper after the rider has passed through and the gate is automatically closed.

In Fig. 6 the construction of parts of the fastening device is somewhat varied to enable the latch-loop $e$ to take into the keeper F from the under side, as this form is often necessary to prevent the gates from being lifted and opened by cattle, some of which soon learn the knack of raising the end sufficiently to bring the latch out of the keeper when it takes in from the upper side. In this instance the keeper is turned downward and the swivel-loop $d$ of the latch is turned at right angles to the latch-loop $e$, to enable the rod K to be moved up and down in opening and closing the gate.

In cases where it is not desirable to secure the latch over the keeper by means of a padlock, as where a gate is much used by different persons, all of whom would require a key, and at the same time where extra security is necessary to prevent the gates being opened by cattle, I have provided a security-latch, L, consisting of a metallic rod bent at about its central point to form a U-shaped locking-loop, $l$, which stands at right angles with its journals M. This security-latch is also journaled in the upright D and post $a$ of the gate, and is made to operate in the space between them above the latch E. One of the journals may be extended through the upright D and bent to form a hand-loop, $m$, by which the latch may be operated. A small rest or cross-bar, N, is fastened to the post and upright and extends across the space between them, against which the security-latch rests when not required for use. This security-latch is provided with an automatically-locking keeper, consisting of a strip, O, of wood or other suitable material, secured to the side of the gate-post G by screws, nails, or other suitable means, and preferably extending from near the bottom to about the top of the post.

At a suitable distance above the plane of the journals M of the latch the strip O is severed by an incline cut from without, extending upward and inward toward the gate, leaving the lower portion of the upper section, $o$, extending downward and outward, while the upper portion of the lower section, $p$, extends upward and inward toward the gate. The inner side of the beveled portion of the lower section, $p$, of the strip is cut out, leaving a recess, $n$, between the beveled end and post G, to enable the security-loop $l$ to pass over it. The upper section, $o$, of the strip is pivoted to the post at Q near its top, so that its lower beveled portion shall register with that of the lower section, $p$, to form a tight joint when brought together, and its upper end is extended above the upper end of the post to form a handle, $q$.

On the outer side of the section $o$ of the strip there is a compression-spring, P, attached to the post near its upper end, which bears against the side of the section and keeps its beveled surface closely in contact with that of the lower section.

When it is desired to use the reserve-latch continuously in place of the hand-loop $m$, (shown in Fig. 1,) there may be substituted a pulley on the journal of the latch, as shown in Fig. 3, so that it can be operated from above the gate in the same manner as one of the latches hereinbefore described.

In operating this form of my device in securing the gate a short belt is placed over the pulleys above the gate-frame and the one on the security-latch, when a quick sharp turn of the crank J is made, moving the U-shaped loop $l$, which describes about one-fourth of a circle, throwing the loop from the rest-bar N against the pivoted upper section, $o$, of the security-keeper, which yields, bending the spring P backward, and allowing the outer portion of the loop to pass through between the inclined cuts and to rest against the opposite side of the keeper just below the cuts, when the keeper is automatically closed by the spring and held in that position. To release the security-latch, the handle $q$ of the upper section of the keeper is grasped with one hand and gentle traction made toward the gate, pressing the spring P back and opening the keeper, while at the same time the other hand is used in giving the U-shaped loop a quarter-turn, which brings it out from behind the keeper and restores it to its original position against the rest-bar N.

I do not confine my improvements to gates of this particular construction, as they may be used on board gates or doors, or on any other construction of opening device where they are adapted to work.

Having thus fully described my invention, what I claim as new, and desire to secure by Letters Patent of the United States, is—

1. The combination, with an automatically-closing gate having uprights and spaces near its locking end, of a loop-latch journaled in the gate-frame and extending into the spaces, said latch being adapted to turn over the keeper at right angles to the frame of the gate, and means for operating said latch from above the gate-frame, as set forth.

2. The combination, with a gate having vertical spaces between uprights near its locking end, and a loop-latch journaled therein adapted to be turned over a keeper at right angles to the gate, of pulleys, one on the journal of the latch and the other above the gate-frame, and a belt uniting said pulleys, whereby the latch can be turned from above the frame, as set forth.

3. The combination, with a gate having uprights and posts with vertical spaces between them at its locking end, of a loop-latch journaled in said space, and a gate-post having an automatically-locking keeper adapted to receive and hold said loop-latch, as set forth.

4. The combination, with a gate having a loop-latch journaled in uprights therein and resting against a cross-bar extending from one to the other, of an automatic closing keeper adapted to receive said latch, consisting of a strip, the lower section of which is rigidly secured to the gate-post, and the upper section pivoted at near the upper end of the post, the ends of the two sections being kept in contact by a spring secured to the post and resting against the pivoted section, as set forth.

In testimony whereof I affix my signature in presence of two witnesses.

HENRY L. BOOTH.

Witnesses:
JNO. D. FLAUTT,
W. C. NELSON.